US005513253A

United States Patent [19]

Yoshida et al.

[11] Patent Number: 5,513,253

[45] Date of Patent: Apr. 30, 1996

[54] FACSIMILE APPARATUS

[75] Inventors: Takehiro Yoshida, Tokyo; Shigeru Koizumi, Urawa; Shigeo Miura, Tokyo; Yuji Kurosawa, Kawasaki; Yasuo Fujii; Hiroyuki Noguchi; Toru Nakayama, all of Yokohama; Junnosuke Kataoka, Kawasaki; Masaaki Okada, Tokyo, all of Japan

[73] Assignee: Canon Kabushiki Kaisha, Tokyo, Japan

[21] Appl. No.: 165,503

[22] Filed: Dec. 13, 1993

[30] Foreign Application Priority Data

Dec. 22, 1992 [JP] Japan .................................... 4-342497

[51] Int. Cl.[6] ............................ H04M 11/00; H04M 1/00

[52] U.S. Cl. ............................................ 379/100; 379/373

[58] Field of Search .................................... 379/100, 373, 379/375; 358/441, 400, 468; 381/104, 109

[56] References Cited

U.S. PATENT DOCUMENTS

| | | | |
|---|---|---|---|
| 4,076,968 | 2/1978 | Wattenbarger | 379/375 |
| 4,523,058 | 6/1985 | Stevens et al. | 379/375 |
| 4,773,080 | 9/1988 | Nakajima et al. | 379/100 |
| 4,989,237 | 1/1991 | Kotani et al. | 379/100 |
| 5,128,985 | 7/1992 | Yoshida et al. | 379/100 |
| 5,216,705 | 6/1993 | Yoshida et al. | 379/100 |
| 5,333,062 | 7/1994 | Hara et al. | 358/441 |

FOREIGN PATENT DOCUMENTS

| | | | |
|---|---|---|---|
| 0187455 | 8/1986 | Japan | 379/375 |
| 403283748 | 12/1991 | Japan | 379/375 |

OTHER PUBLICATIONS

The article "Xerox 3010, Facsimile Terminal Operator Manual" p. 123, May 1990.

*Primary Examiner*—Jason Chan

*Attorney, Agent, or Firm*—Fitzpatrick, Cella, Harper & Scinto

[57] ABSTRACT

A facsimile apparatus can output a plurality of kinds of audible sounds. In the apparatus, the level of a sound is increased when outputting a specific audible sound compared with when outputting audible sounds other than the specific audible sound.

14 Claims, 7 Drawing Sheets

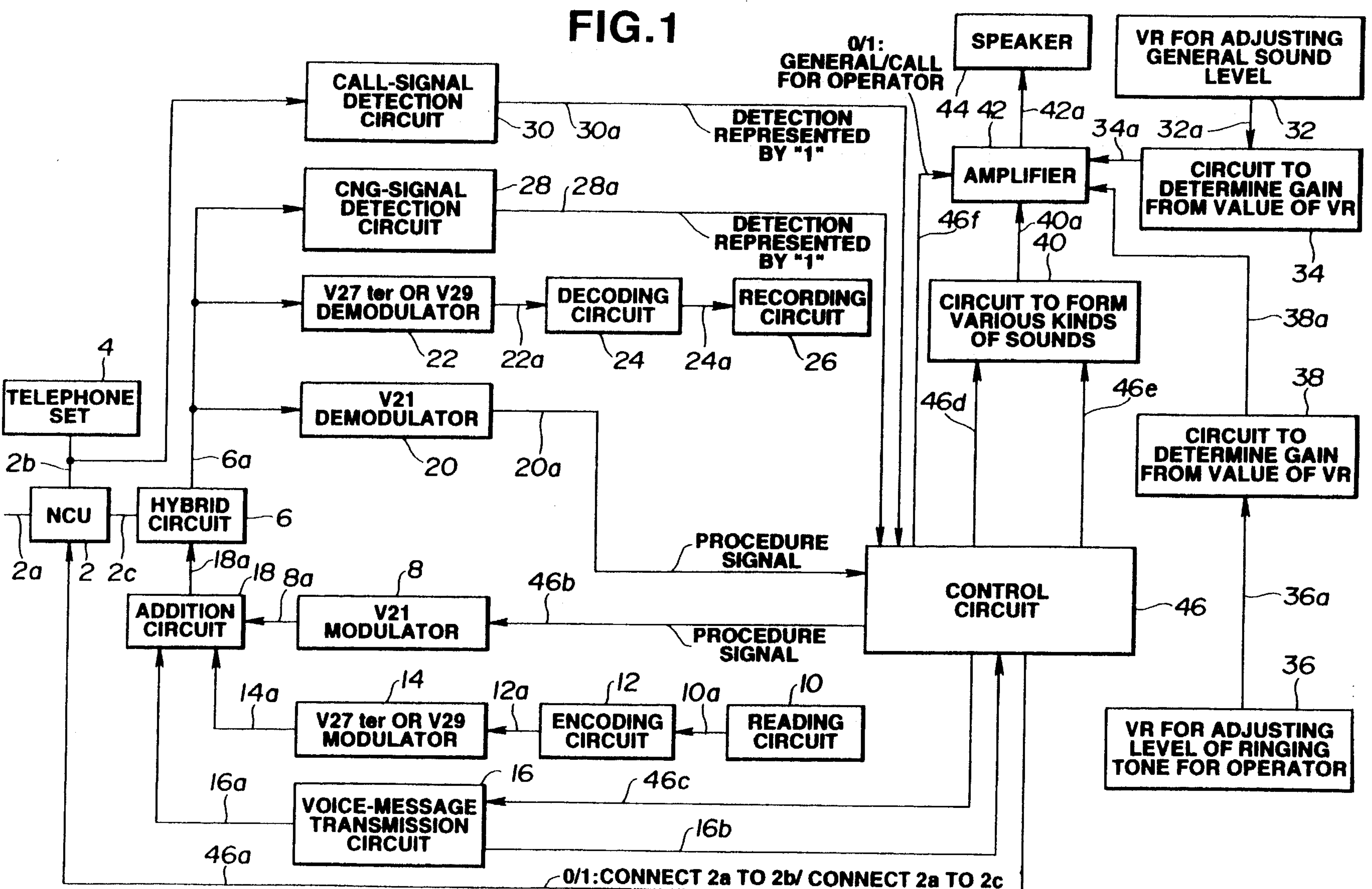
FIG.1
CALL-SIGNAL DETECTION CIRCUIT
CNG-SIGNAL DETECTION CIRCUIT
V27 ter OR V29 DEMODULATOR
DECODING CIRCUIT
RECORDING CIRCUIT
V21 DEMODULATOR
TELEPHONE SET
NCU
HYBRID CIRCUIT
ADDITION CIRCUIT
V21 MODULATOR
V27 ter OR V29 MODULATOR
ENCODING CIRCUIT
READING CIRCUIT
VOICE-MESSAGE TRANSMISSION CIRCUIT
DETECTION REPRESENTED BY "1"
DETECTION REPRESENTED BY "1"
PROCEDURE SIGNAL
PROCEDURE SIGNAL
CONTROL CIRCUIT
0/1: GENERAL/CALL FOR OPERATOR
SPEAKER
AMPLIFIER
CIRCUIT TO FORM VARIOUS KINDS OF SOUNDS
VR FOR ADJUSTING GENERAL SOUND LEVEL
CIRCUIT TO DETERMINE GAIN FROM VALUE OF VR
CIRCUIT TO DETERMINE GAIN FROM VALUE OF VR
VR FOR ADJUSTING LEVEL OF RINGING TONE FOR OPERATOR
0/1:CONNECT 2a TO 2b/ CONNECT 2a TO 2c

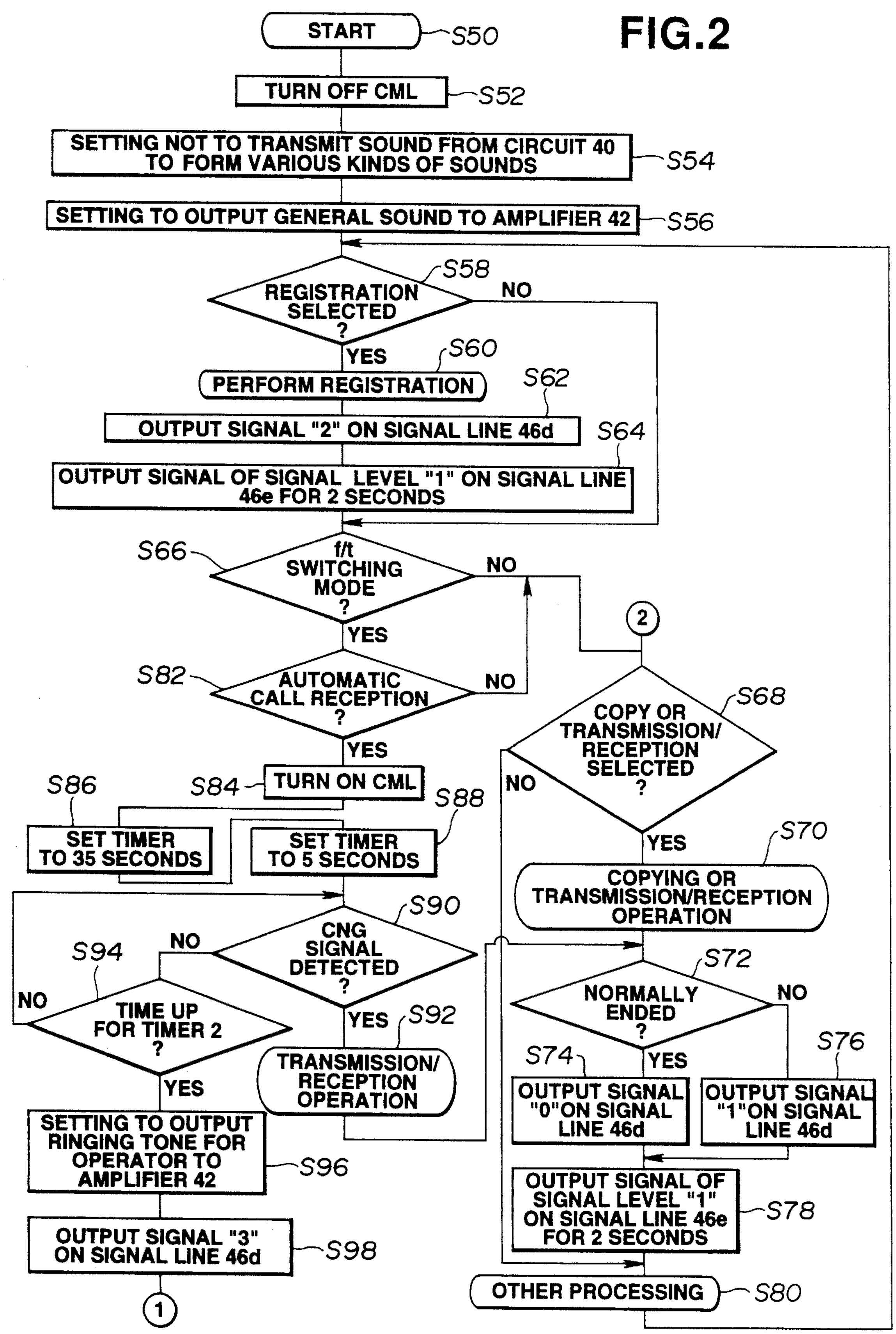
FIG.2
START
S50
TURN OFF CML
S52
SETTING NOT TO TRANSMIT SOUND FROM CIRCUIT 40 TO FORM VARIOUS KINDS OF SOUNDS
S54
SETTING TO OUTPUT GENERAL SOUND TO AMPLIFIER 42
S56
REGISTRATION SELECTED ?
S58
NO
YES
PERFORM REGISTRATION
S60
OUTPUT SIGNAL "2" ON SIGNAL LINE 46d
S62
OUTPUT SIGNAL OF SIGNAL LEVEL "1" ON SIGNAL LINE 46e FOR 2 SECONDS
S64
f/t SWITCHING MODE ?
S66
NO
YES
2
AUTOMATIC CALL RECEPTION ?
S82
NO
YES
COPY OR TRANSMISSION/ RECEPTION SELECTED ?
S68
NO
YES
TURN ON CML
S84
SET TIMER TO 35 SECONDS
S86
SET TIMER TO 5 SECONDS
S88
COPYING OR TRANSMISSION/RECEPTION OPERATION
S70
CNG SIGNAL DETECTED ?
S90
NO
YES
TIME UP FOR TIMER 2 ?
S94
NO
YES
TRANSMISSION/ RECEPTION OPERATION
S92
NORMALLY ENDED ?
S72
NO
YES
OUTPUT SIGNAL "0"ON SIGNAL LINE 46d
S74
OUTPUT SIGNAL "1"ON SIGNAL LINE 46d
S76
SETTING TO OUTPUT RINGING TONE FOR OPERATOR TO AMPLIFIER 42
S96
OUTPUT SIGNAL OF SIGNAL LEVEL "1" ON SIGNAL LINE 46e FOR 2 SECONDS
S78
OUTPUT SIGNAL "3" ON SIGNAL LINE 46d
S98
OTHER PROCESSING
S80
1

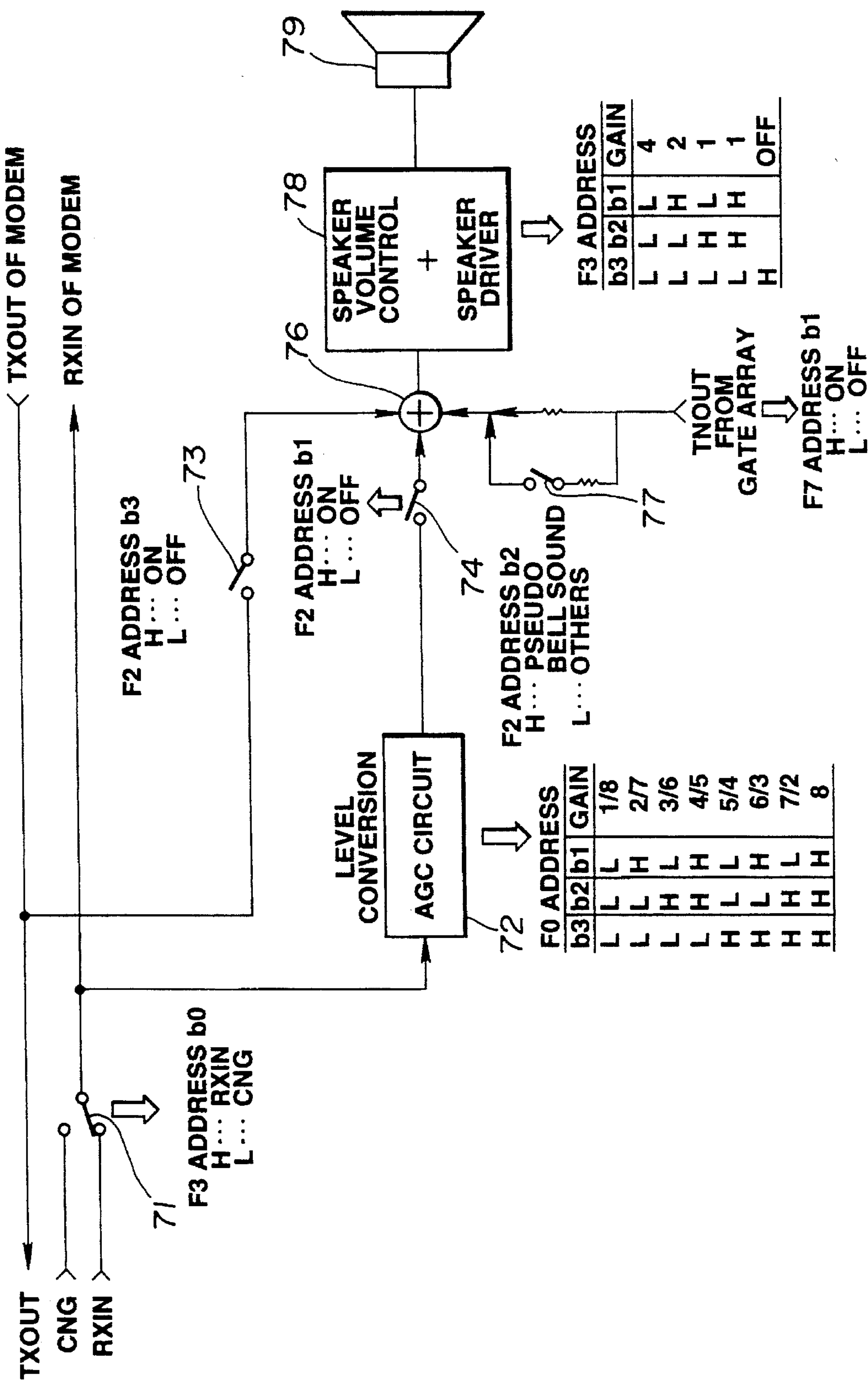
FIG.6
TXOUT
CNG
RXIN
TXOUT OF MODEM
RXIN OF MODEM
71
F3 ADDRESS b0
H··· RXIN
L··· CNG
72
LEVEL CONVERSION
AGC CIRCUIT
F0 ADDRESS
b3 b2 b1 GAIN
L L L 1/8
L L H 2/7
L H L 3/6
L H H 4/5
H L L 5/4
H L H 6/3
H H L 7/2
H H H 8
73
F2 ADDRESS b3
H··· ON
L··· OFF
74
F2 ADDRESS b1
H··· ON
L··· OFF
76
77
F2 ADDRESS b2
H··· PSEUDO BELL SOUND
L··· OTHERS
TNOUT FROM GATE ARRAY
F7 ADDRESS b1
H··· ON
L··· OFF
78
SPEAKER VOLUME CONTROL
+
SPEAKER DRIVER
F3 ADDRESS
b3 b2 b1 GAIN
L L L 4
L L H 2
L H L 1
L H H 1
H OFF
79

FACSIMILE APPARATUS

BACKGROUND OF THE INVENTION

1. Field of the Invention

This invention relates to a facsimile apparatus, and more particularly, to a facsimile apparatus having a function of performing switching between facsimile and telephone.

The invention also relates to an apparatus for calling the operator by fax/tel (facsimile/telephone) switching or the like, and more particularly, to an apparatus for calling the operator by generating an audible sound from a facsimile apparatus.

2. Description of the Related Art

In a conventional facsimile apparatus, the apparatus automatically determines in an automatic call-receiving operation whether the calling side is a facsimile apparatus or a telephone set. In the case of a facsimile apparatus, facsimile communication is executed. In the case of a telephone set, the operator is called.

In such a conventional apparatus, all of a sound when calling the operator, a normal end sound, an error sound, a registration sound and the like have the same sound level.

That is, in the conventional apparatus, a ringing tone for the operator is output in the same sound level as that of other audible sounds.

In the above-described conventional apparatus, however, the operator has difficulty in catching the ringing tone for the operator since the sound level is low.

That is, in the conventional apparatus, the sound level of the speaker of the apparatus is adjusted to a small value, since a normal end sound, an error sound, a registration sound and the like need not have a large sound level. The apparatus automatically determines in an automatic call-receiving operation whether the calling side is a facsimile apparatus or a telephone set. In the case of a telephone set, the operator is called from the speaker. However, since the sound level of the speaker is adjusted to a small value, the user cannot hear the ringing tone. Hence, the conventional apparatus has the great disadvantage that fax/tel automatic switching cannot be efficiently utilized.

SUMMARY OF THE INVENTION

The present invention has been made in consideration of the above-described problems.

It is an object of the present invention to improve a facsimile apparatus.

It is another object of the present invention to make the level of a specific audible sound generated by a facsimile apparatus greater than the level of other audible sounds.

According to one aspect, the present invention which achieves these objectives relates to a facsimile apparatus capable of outputting a plurality of kinds of audible sounds, comprising means for increasing the level of a sound when outputting a specific audible sound compared with when outputting an audible sound other than the specific audible sound.

According to another aspect, the present invention which achieves these objectives relates to a facsimile apparatus capable of outputting a plurality of kinds of audible sounds, comprising means for gradually increasing the level of a specific audible sound, and for making the level of audible sounds other than the specific audible sound to be constant.

According to still another aspect, the present invention which achieves these objectives relates to a facsimile apparatus capable of outputting a plurality of kinds of audible sounds, comprising means for outputting a ringing tone for an operator with a sound level greater than the level of other audible sounds and by a separate setting operation.

According to yet another aspect, the present invention which achieves these objectives relates to a facsimile apparatus comprising communication means for performing image communication, speaker means for generating a signal sound, conversation means for enabling conversation by an operator, and control means for causing the speaker means to generate a first sound having a first sound level when the control means detects that the communication means has received from a communication partner a signal to request a response of the operator through the conversation means, and for causing the speaker means to generate a signal sound having a second sound level different from the first sound level.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 1 is a block diagram of a facsimile apparatus according to a first embodiment of the present invention;

FIGS. 2 and 3 are flowcharts illustrating the control of control circuit 46 shown in FIG. 1;

FIG. 6 is a block diagram of the speaker control unit shown in FIG. 5.

DETAILED DESCRIPTION OF THE PREFERRED EMBODIMENTS

First Embodiment

Figure 3:
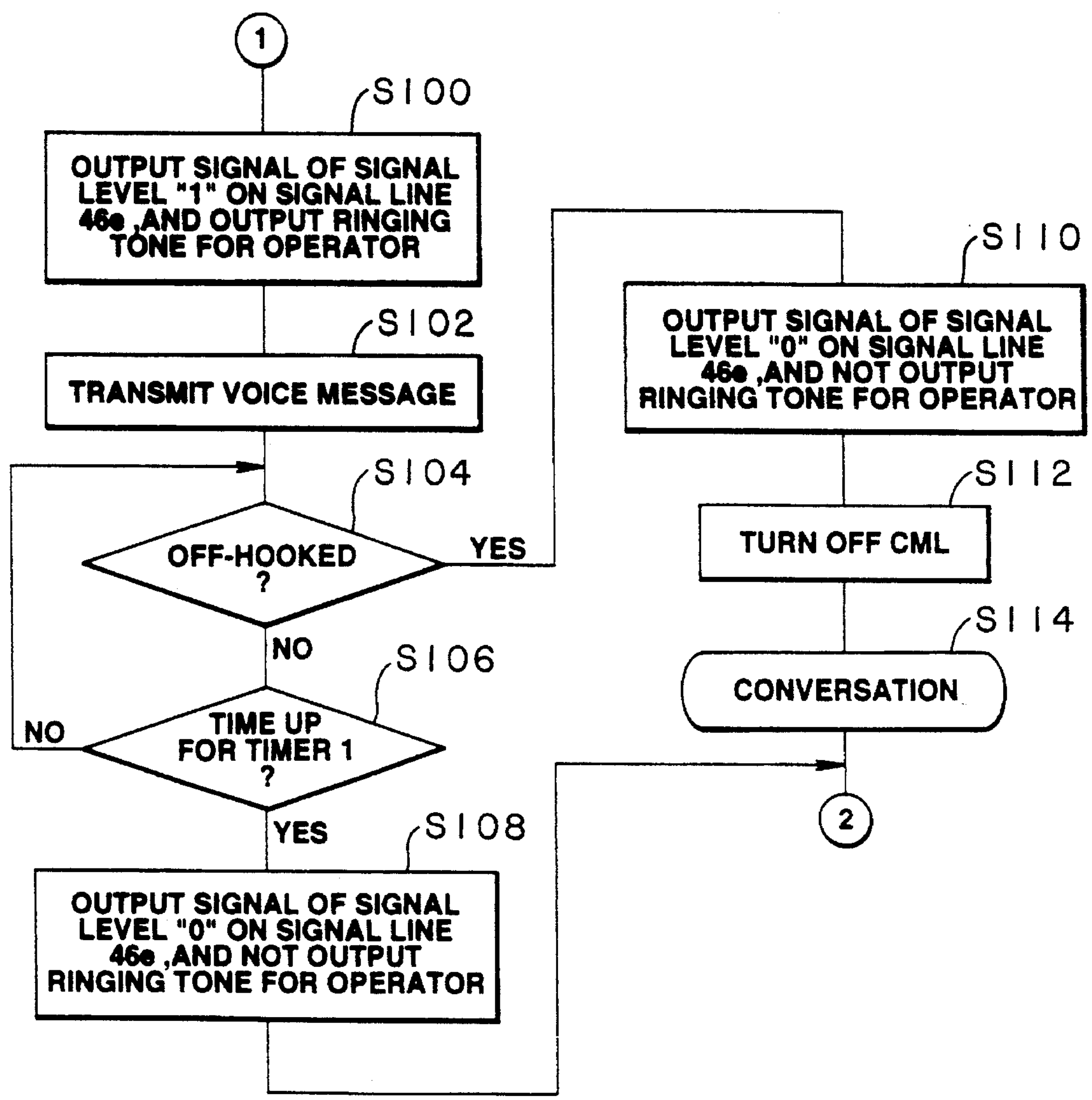

A first embodiment of the present invention will now be described in detail with reference to the drawings.

FIG. 1 is a block diagram of a facsimile apparatus of the first embodiment.

In FIG. 1, network control unit (NCU) 2 is connected to a terminal of a telephone line in order to use a telephone network for data communication and the like. NCU 2 performs connection control of a telephone exchange network, switching of data communication channels, and maintenance of the loop. Signal line 2*a* is a telephone line. A signal on signal line 46*a* is input to NCU 2. When the signal level equals "0", the telephone line is connected to the side of telephone set 4, i.e., signal line 2*a* is connected to signal line 2*b*. When the signal level equals "1", the telephone line is connected to the side of the facsimile apparatus, i.e., signal line 2*a* is connected to signal line 2*c*. Usually, the telephone line is connected to the side of telephone set 4.

Hybrid circuit 6 separates the signal of the transmission system from the signal of the reception system. A transmission signal on signal line 18*a* passes through signal line 2*c*, and is transmitted to the telephone line via NCU 2. A signal transmitted from the communication partner passes through signal line 2*c* after being input to NCU 2, and is output onto signal line 6*a*.

Modulator 8 performs modulation based on CCITT (Comité Consulatif International Télégraphique et Téléphonique) recommendation V21. Modulator 8 receives a procedure signal on signal line 46*b*, modulates the signal, and outputs modulated data onto signal line 8*a*.

Reading circuit 10 sequentially reads an image signal for one line in the main scanning direction from an original to be transmitted, and forms a string of signals, each comprising a binary value representing black or white. Reading circuit 10 is configured by an image pickup device, such as a CCD (charge-coupled device) or the like, and an optical system. The signal string is output onto signal line 10*a*.

Encoding circuit 12 receives read data output on signal line 10*a*, performs encoding (MH (modified Huffman) coding or MR (modified Read) coding) of the data, and outputs encoded data onto signal line 12*a*.

Modulator 14 performs modulation based on known CCITT recommendation V27ter (differential phase-shift keying) or V29 (orthogonal modulation). Modulator 14 receives a signal on signal line 12*a*, modulates the signal, and outputs modulated signal onto signal line 14*a*.

Voice-message transmission circuit 16 transmits a voice message "Wait for a moment." onto signal line 16*a* when a transmission command pulse has been generated on signal line 46*c*, and generates an end pulse on signal line 16*b* when the transmission of the voice message has been terminated.

Addition circuit 18 receives signals on signal lines 8*a*, 14*a* and 16*a*, adds the signals, and outputs the result of addition onto signal line 18*a*.

Demodulator 20 performs demodulation based on the known CCITT recommendation V21. Demodulator 20 receives a signal on signal line 6*a*, performs V21 demodulation of the signal, and outputs demodulated data onto signal line 20*a*.

Demodulator 22 performs demodulation based on the known CCITT recommendation V27ter or V29. Demodulator 22 receives a signal on signal line 6*a*, demodulates the signal, and outputs demodulated data onto signal line 22*a*.

Demodulation circuit 24 receives a signal on signal line 22*a*, performs decoding (MH decoding or MR decoding) of the signal, and outputs decoded data onto signal line 24*a*.

Recording circuit 26 receives data on signal line 24*a*, and sequentially records the data for respective lines.

CNG-signal detection circuit 28 outputs a signal of signal level "1" onto signal line 28*a* when it determines that a CNG signal is detected, and outputs a signal of signal level "0" onto signal line 28*a* when it determines that a CNG signal is not detected.

16-Hz-call-signal detection circuit 30 receives a signal on signal line 2*b*, outputs a signal of signal level "1" onto signal line 30*a* when a call signal is detected, and outputs a signal of signal level "0" onto signal line 30*a* when a call signal is not detected.

Reference numeral 32 represents a variable resistor for adjusting the level of a general sound other than a ringing tone for the operator. Analog information having a value between 0 and 1 is output onto signal line 32*a* as information relating to the position of variable resistor 32.

Circuit 34 determines the gain of amplifier 42 from the value of variable resistor 32. For example, information on signal line 32*a* is directly output onto signal line 34*a* to provide the gain of amplifier 42. That is, the gain of amplifier 42 has a value between 0 and 1.

Reference numeral 36 represents a variable resistor for adjusting the level of the ringing tone for the operator. Analog information having a value between 0 and 1 is output onto signal line 36*a* as information relating to the position of variable resistor 36.

Circuit 38 determines the gain of amplifier 42 from the value of variable resistor 36. For example, a value obtained by adding 0.5 to the information on signal line 36*a* is output onto signal line 38*a* to provide the gain of amplifier 42. That is, the gain of amplifier 42 has a value between 0.5 and 1.5.

Circuit 40 forms various kinds of sounds, and outputs an assigned sound onto signal line 40*a* by assigning the kind of the sound by a signal output onto signal line 46*d* and outputting a signal having signal level "1" from control circuit 46. A normal end sound, an error sound, a registration sound and a ringing tone for the operator are generated when signals "0", "1", "2" and "3" are output on signal line 46*d*, respectively. No sound is generated on signal line 40*a* when a signal of signal level "0" is output on signal line 46*e*.

Amplifier 42 receives a signal on signal line 40*a*, and outputs a signal onto signal line 42*a* changing the signal level by adopting gains output on signal lines 34*a* and 38*a* when signals of signal levels "0" and "1" are output on signal line 46*f*, respectively.

Speaker 44 receives information on signal line 42*a*, converts the information into a sound, and outputs the sound.

Control circuit 46 controls the output level of each of a plurality of kinds of audible sounds. Control circuit 46 automatically determines in a call-receiving operation whether the communication partner's apparatus is a facsimile apparatus or a telephone set in an automatic call-receiving operation. In the case of a telephone set, control circuit 46 outputs a ringing tone for the operator. At that time, the level of the singing tone for the operator is arranged to be greater than the level of audible sounds other than the ringing tone for the operator. The level of the ringing tone for the operator and the level of audible sounds other than the singing tone for the operator can be set independently. The level of the singing tone for the operator is arranged to be equal to at least a predetermined value even when the variable resistor is set to the minimum value.

FIG. 2 is a flowchart of the control performed by control circuit 46 shown in FIG. 1.

In FIG. 2, step S50 indicates the start of the control.

In step S52, a signal of signal level "0" is output onto signal line 46*a*, and the CML is turned off.

In step S54, a signal of signal level "0" is output onto signal line 46*e*, so that no sound is transmitted from circuit 40 for forming various kinds of sounds.

In step S56, a signal of signal level "0" is output onto signal line 46*f* to set amplifier 42 so that a general sound other than the ringing tone for the operator is output.

In step S58, an signal from an operation unit (not shown) is input, and it is determined if registration has been selected. If the result of the determination is affirmative, the process proceeds to step S60, in which a registration operation is performed. If the result of the determination is negative, the process proceeds to step S66.

In step s62, signal "2" is output onto signal line 46*d*. In step S64, a signal of signal level "1" is output onto signal line 46*e* for two seconds to generate a registration sound. The gain of amplifier 42 is determined based on information from signal line 38*a*.

In step S66, it is determined if a fax/tel-switching mode has been selected. If the result of the detemination is affirmative, the process proceeds to step S82. If the result of the determination is negative, the process proceeds to step S68.

In step S68, it is determined if a copying operation or transmission/reception has been selected. if the result of the determination is affirmative, the process proceeds to step S70, in which a copying operation or a transmission/reception operation is performed. If the result of the determination is negative, the process proceeds to step S80.

In step S72, it is determined if the process has normally ended. If the result of the determination is affirmative, the process proceeds to step S74, in which signal "0" is output onto signal line 46*d*, so that a normal end sound is generated. If the result of the determination in step S72 is negative, i.e., the process has ended with an error, the process proceeds to step S76, in which signal "1" is output onto signal line 46*d*, so that an error sound is output.

In step S78, a signal of signal level "1" is output onto signal line 46*e* for two seconds, so that the normal end sound or the error sound assigned in step S74 or S76 is output, respectively. The gain of amplifier 42*a* is determined based on information from signal line 38*a*.

In step S80, other processing is performed.

In step S82, a signal on signal line 30*a* is input, and it is determined if a call signal is detected. If the result of the determination is affirmative, the process proceeds to step S84. If the result of the determination is negative, the process proceeds to step S68.

In step S84, a signal of signal level "1" is output onto signal line 46*a* to turn on the CML.

In step S86, timer 1 is set to 35 seconds. In step S88, timer 2 is set to 5 seconds.

In step S90, a signal on signal line 28 is input, and it is determined if a CNG signal has been detected. If the result of the determination is affirmative, the communication partner is determined to be communication (fax), and the process proceeds to step S92, in which a transmission/reception operation is performed. If the result of the determination in step S90 is negative, the process proceeds to step S94.

In step S94, it is determined if time is up for timer 2. If the result of the determination is affirmative, the communication partner is determined to be a person (tel), and the process proceeds to step S96. If the result of the determination in step S94 is negative, the process proceeds to step S90.

In step S96, a signal of signal level "1" is output onto signal line 46*f*, so that amplifier 42 is set to output a ringing tone for the operator.

In step S98, signal "3" is output onto signal line 46*d*. In step S100, a signal of signal level "1" is output onto signal line 46*e*, so that the ringing tone for the operator is output. The gain of amplifier 42 is determined based on information from signal line 34*a*.

In step S102, a voice message is transmitted to the telephone line using signal lines 46*c* and 16*b*.

In step S104, it is determined if the telephone receiver has been off-hooked. If the result of the determination is affirmative, the process proceeds to step S110, in which a signal of signal level "0" is output onto signal line 46*e*, so that the ringing tone for the operator is not output.

In step S112, a signal of signal level "0" is output onto signal line 46*a*, so that the CML is turned off to connect the telephone line to the side of the telephone set.

Step S114 represents a conversation state.

If the result of the determination in step S104 is negative, the process proceeds to step S106.

In step S106, it is determined if time is up for timer 1. If the result of the determination is affirmative, the process proceeds to step S108, in which a signal of signal level "0" is output onto signal line 46*e*, so that the ringing tone for the operator is not output. If the result of the determination in step S106 is negative, the process returns to step S104, and call for the operator is continued.

Second Embodiment

In the above-described embodiment, the sound level of the ringing tone for the operator is set independently of the sound level of other audible sounds.

However, the sound level of the ringing tone for the operator may have a predetermined relationship with the sound level of other audible sounds, and the sound levels of the ringing tone for the operator and the level of other audible sounds may be controlled using a single variable resistor. The sound level of the ringing tone for the operator is arranged to have at least a predetermined value even in a state in which the variable resistor is set to the minimum value.

Figure 4:
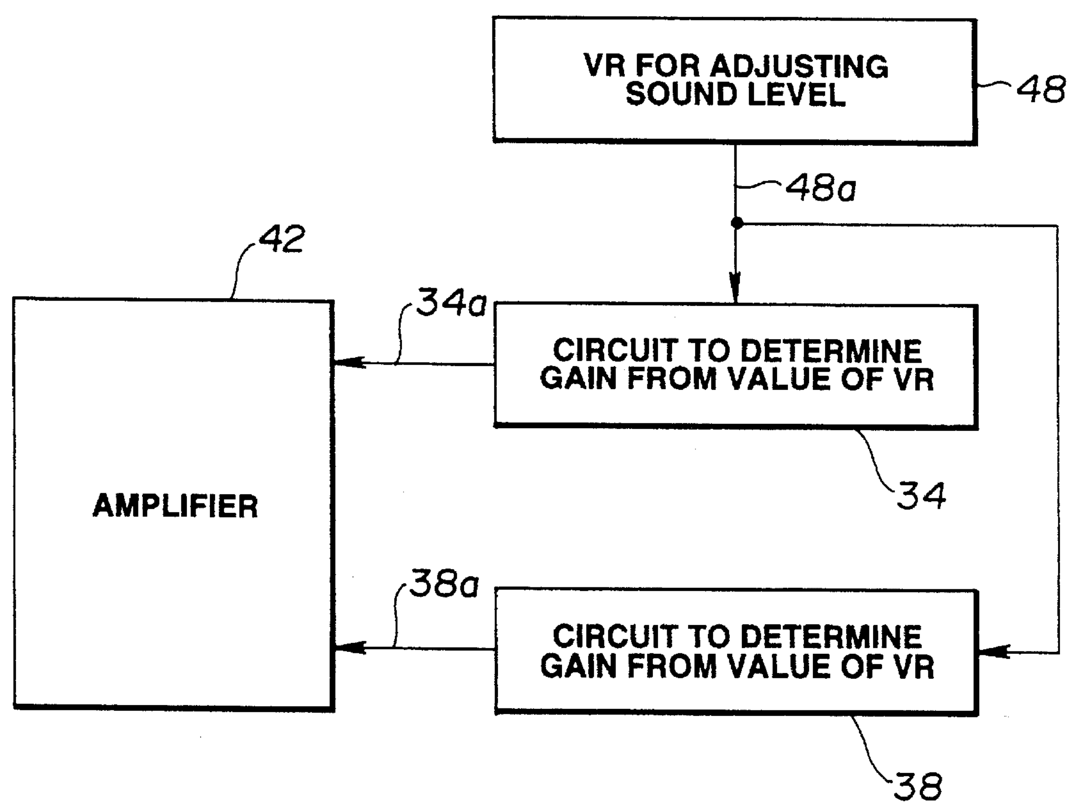
FIG. 4 is a block diagram of a facsimile apparatus according to a second embodiment of the present invention.

FIG. 4 is a block diagram illustrating only a portion of an apparatus of the present embodiment which differs from the apparatus shown in FIG. 1.

In FIG. 4, the apparatus of the present embodiment differs from the apparatus shown in FIG. 1 in that VR (variable resistor) 32 for adjusting a general sound and VR 36 for adjusting the sound level of the ringing tone for the operator are replaced by a single VR 48 for adjusting the sound level. VR 48 outputs analog information having a value between 0 and 1 onto signal line 48*a* as information relating to the position of the variable resistor.

Circuit 34 is the same circuit as that shown in FIG. 1, and determines the gain of amplifier 42 from information 48 relating to the position of the variable resistor. For example, information on signal line 48*a* is directly output onto signal line 34*a* to provide the gain of amplifier 42. That is, the gain of amplifier 42 has a value between 0 and 1.

Circuit 38 is the same circuit as that shown in FIG. 1, and determines the gain of amplifier 42 from information relating to the variable resistor. For example, a value obtained by adding 0.5 to the information on signal line 48*a* is output onto signal line 38*a* to provide the gain of amplifier 42. That is, the gain of amplifier 42 has a value between 0.5 and 1.5.

Other circuits and the control of control circuit 46 are the same as those shown in FIGS. 1 and 2.

According to the above-described configuration, it is possible to control the sound level of the ringing tone for the operator and the sound level of other audible sounds by a single variable resistor so that a predetermined relationship is maintained between the two levels. The ringing tone for the operator can be heard even the variable resistor is set to the minimum value.

Third Embodiment

Although in the above-described embodiments, the gain of the amplifier for the sound level of the ringing tone for the operator is set to a value obtained by adding 0.5 to the gain for the sound level of other sounds, any other relationship may be provided between the sound level of the ringing to for the operator and the sound level of other sounds. For example, the gain for the sound level of the ringing tone for the operator may have an offset with respect to the gain for the sound level of other sounds, and then the gain for the sound level of the riging tone for the operator may be multiplied by a certain value.

Fourth Embodiment

In the above-described embodiments, a variable resistor is used for adjusting the sound level. However, instead of using the variable resistor, the sound levels may, for example, be set to a large, medium and small values in soft switches or the like through an operation unit, and the gain of the speaker may be determined based on information relating to the set values.

In such a case, the setting of the sound level in the soft switches may be performed independently for the ringing tone for the operator and other sounds. Alternatively, a single soft switch for determining a certain sound level may be provided, and the sound level of the ringing tone for the operator and the sound level of other sounds may be determined so as to have a predetermined relationship based on information relating to the value of the soft switch. In such a case, it is important to arrange the system so that registration for the soft switch can be performed even during communication, since it is desirable to reduce the sound level as soon as possible when the sound level has been recognized to be large after starting the communication.

Fifth Embodiment

The sound level of the ringing tone for the operator may, for example, have the same value as the sound level of other sounds when starting the communication, and may be increased in accordance with the lapse of time.

More specifically, in FIG. 4, the method of determining the gain of amplifier 42 may be changed from the value of circuit 34. That is, circuit 34 may first directly output information output on signal line 48*a* onto signal line 34*a,* and then output information obtained by adding multiples of 0.1 to information on signal line 48*a* onto signal line 34*a* every time a certain time period elapses (for example, every three seconds).

Sixth Embodiment

A sixth embodiment of the present invention will now be described in detail with reference to the drawings.

Figure 5:
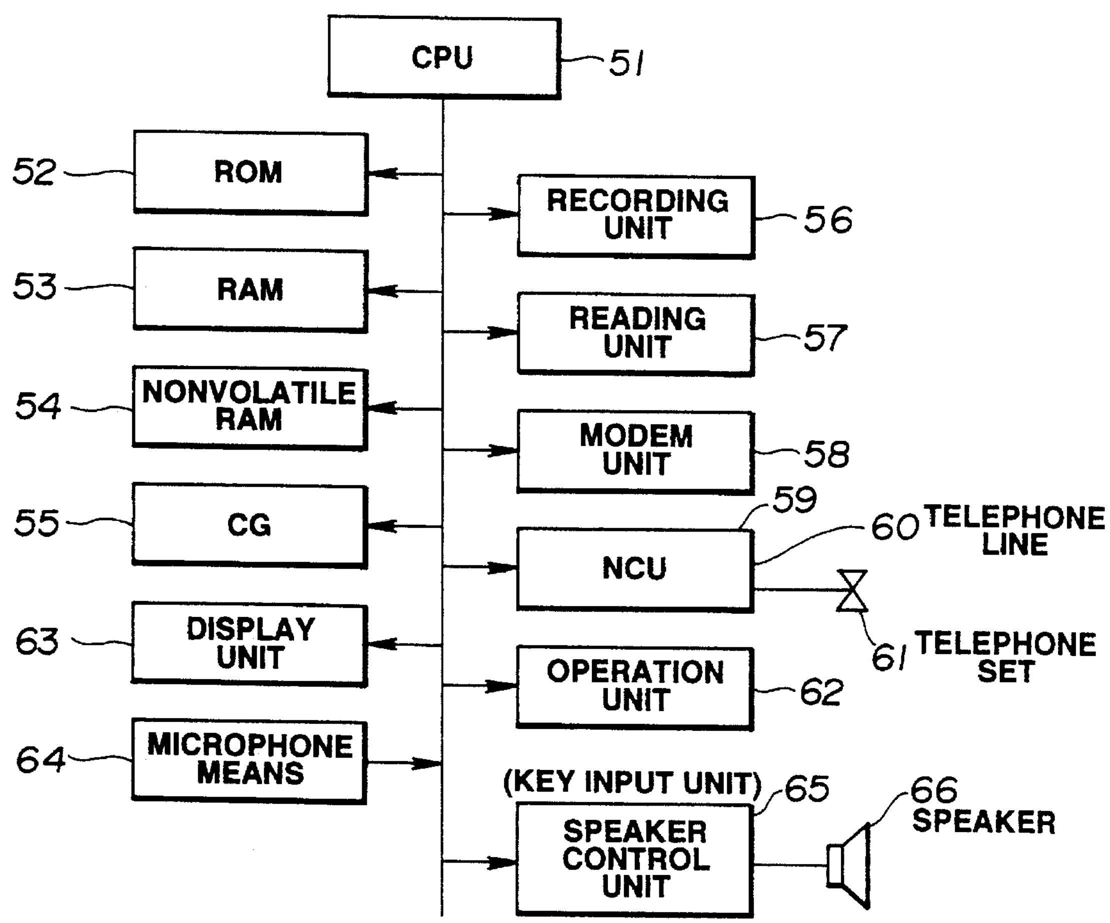
FIG. 5 is a block diagram of a facsimile apparatus according to a sixth embodiment of the present invention.

FIG. 5 is a block diagram illustrating the configuration of a facsimile apparatus of this embodiment. In FIG. 5, CPU (central processing unit) 51 controls the entire operation of the apparatus, and is configured by a microprocessor and the like.

Respective storage means necessary for the control and respective units to be controlled (to be described below) are connected to CPU 51 via data and address buses.

ROM (read-only memory) 52 stores programs (to be described below) and constants necessary for the control. RAM (random access memory) 53 is used as work areas for CPU 51, and is also used for temporarily storing transmitted and received image data.

Nonvolatile RAM 54, comprising a SRAM (static RAM) and the like, is used for registering telephone numbers and abbreviated names of communication partners. Nonvolatile RAM 54 is backed up by a backup power supply (not shown) so that stored data are securely held even if a main power supply is interrupted. Data within nonvolatile RAM 54 are used for controlling abbreviated dials and for other kinds of controls.

Character generator 55 converts information represented by character codes into binary image data. In practice, Character generator 55 includes, for example, a ROM for storing character codes, such as JIS (Japanese Industrial Standards) codes, ASCII (American Standard Code for Information Interchange) codes, and the like, and takes out character data corresponding to a predetermined code, as two-byte data if necessary, based on the control of CPU 51.

Reading of original-image data is performed by reading unit 57, comprising a CCD sensor, an original conveying system and the like. Received image data, or image data read by reading unit 57 during a copying operation is recorded by recording unit 56, such as a thermal printer, an ink-jet printer or the like.

Transmission/reception of image data with telephone line 60 is performed via modem unit 58, which performs modulation/demodulation of image signals and procedure signals, and NCU 59, which performs network connection control with the telephone set for network control, and maintenance of the loop.

Modem 58 includes G3, G2, G1 and FM modems, a clock-signal generation circuit connected to these modems, and the like. Modem 58 modulates transmission data stored in RAM 53 based on the control of CPU 51, and outputs the modulated data to telephone line 60 via NCU 59. Modem 58 also receives an analog signal on telephone line 60 via NCU 59, modulates the signal, and stores obtained binary data in RAM 53.

Telephone set 61 is a telephone set integrated with the facsimile apparatus. The dial operation portion of telephone set 61 is integrated with operation unit 62. More specifically, telephone set 61 includes a hand set, a speech network, a dialer, ten keys, one-touch keys and the like.

The communication operation is controlled by CPU 51 in accordance with the operational input through operation unit 62. Operation unit 62 includes keys to start image transmission, image reception and the like, mode selection keys to assign operational modes during transmission/reception, such as fine, standard, automatic reception and the like, ten keys for dialing, and the like. CPU 51 detects a depressed state of these keys, and controls the above-described respective units in accordance with the detected state.

Display unit 63 includes a liquid-crystal panel for performing a display of about 16 digits, and the like, and is used for displaying the current time and the operational state using characters and the like by the control of CPU 51.

Microphone means 64 is sound level detection means provided for detecting the sound level while telephone set 61 is ringing.

Speaker control unit 65 is subjected to bus connection through an I/O port, and controls speaker 66 by the control of CPU 51.

Speaker 66 generates various kinds of signal sounds from modem 58, CPU 51 and the like by the control of speaker control unit 65.

FIG. 6 is a block diagram of the speaker control unit. In FIG. 6, switching circuit 71 switches between a CNG signal generated when the the handset of the apparatus is off-hooked, and an RXIN signal received during image communication. AGC circuit 72 detects the level of RXIN terminal of the modem, and performs level conversion based on the result of the detection, so that a signal having a constant level is always input to switch circuit 74 for switching on and off the path of the above-described received signal. Switch circuit 73 switches on and off a transmission signal output from TXOUT terminal of the modem. A melody indicating a holding operation, a DTMF (dual-tone multifrequency) or the like is output from TXOUT terminal of the modem to the speaker. Circuit 76 adds a TNOUT signal (a key-touch tone, a ringing tone for the operator, or the like) from the system gate array, a signal from switch circuit 74, and a signal from switch circuit 73. Reference numeral 78 represents a speaker volume control and a speaker driver. The speaker volume control comprises an electronic volume control having four stages, i.e., large, medium, small and disconnection. The electronic volume control is connected to OUT port of the system gate array, and is controlled by a microprocessor provided in the system. Reference numeral 79 represents the speaker. Switch circuit 77 switches between a pseudo bell sound (a ringing tone for the operator) and other sounds (a key-touch sound and the like).

Switches 71, 73, 74 and 77, AGC circuit 72, speaker volume control and speaker driver 78 shown in FIG. 6 are controlled by a control unit of the system through an I/O port (not shown). The operations of these components are regulated by signals of addresses b0–b3 shown in FIG. 6.

Figure 7:
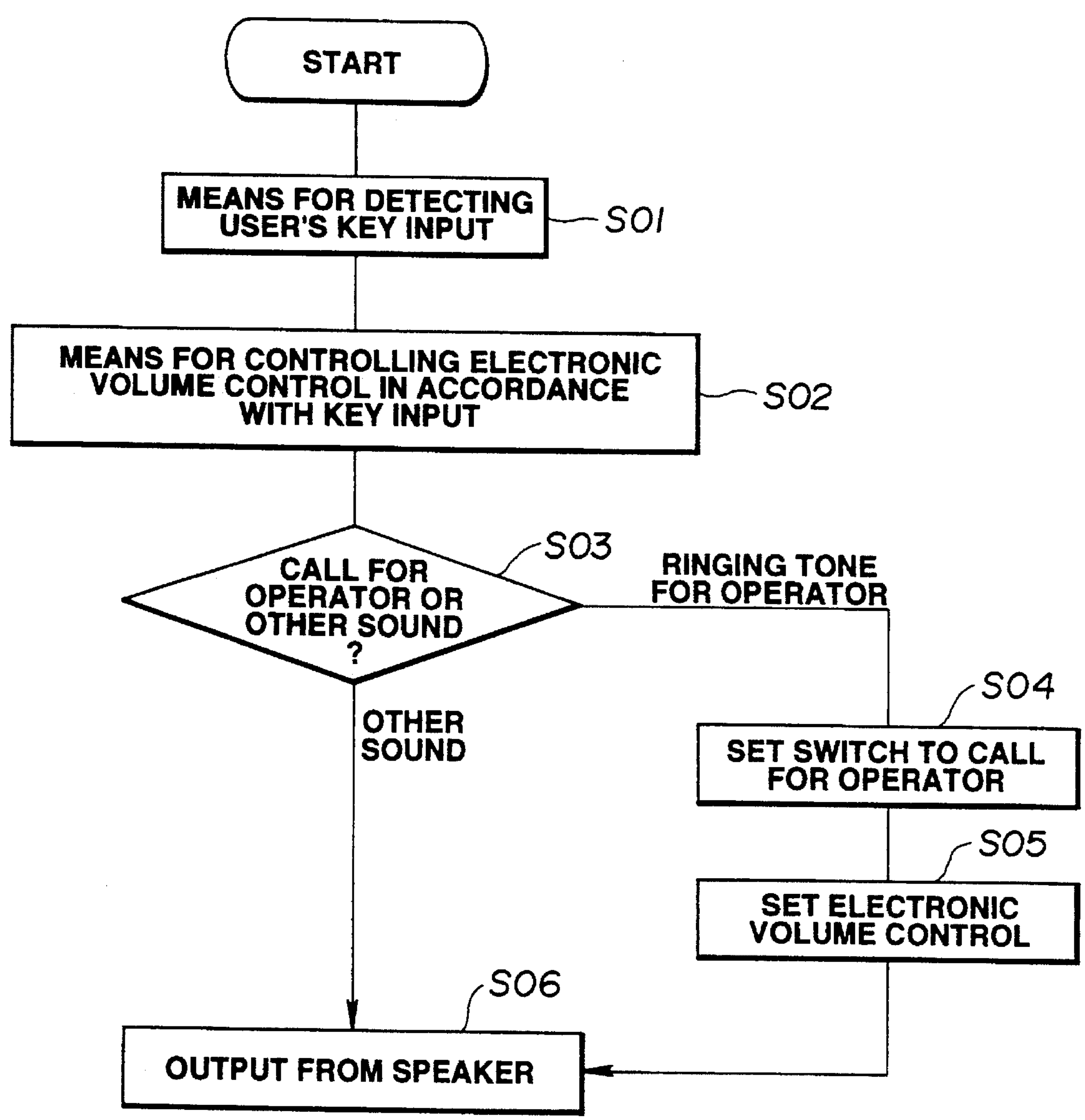
FIG. 7 is a flowchart of the speaker control in the sixth embodiment.

Next, a description will be provided of the speaker control operation in the present embodiment with reference to the flowchart shown in FIG. 7. In step S01, CPU 51 detects a key input of the user through operation unit 62, and stores the setting of the volume control by the user in a memory (RAM 53 or nonvotatile RAM 54). Then, in step S02, electronic volume control 78 is set to the set value stored in the memory in accordance with the key input state in step S01 by controlling an output port of the gate array. In step S03, CPU 51 determines whether the sound to be output is the ringing tone for the operator or other sound. In the case of the ringing tone for the operator, in step S04, switch 77 shown in FIG. 6 is set to an operator-calling mode, so that the sound level is increased only when calling the operator. In step S05, electronic volume control 78 is set to a value set by the user, which is different from the value stored in the memory, by a method different from the above-described setting of the volume control. The above-described method different from the setting of the volume control comprises, for example, a key input through a different switch key on operation unit 62. In step S06, the speaker driver is enabled so as to output a sound from the speaker.

In the present embodiment, when setting the electronic volume control in step S05 shown in FIG. 7, CPU 51 of the facsimile apparatus can detect the state of the switch for setting the ringing tone of the handset of telephone set 61 to large, medium, small and interruption through NCU 59, and the electronic volume control is set in accordance with the setting.

The facsimile apparatus includes means for detecting the external sound (for example, microphone means 64, comprising a microphone and a microphone amplifier, shown in FIG. 5), and the setting of the electronic volume control in step S05 shown in FIG. 7 is determined in accordance with the result of the detection, so that the ringing tone for the operator can be output with a sound level which substantially equals the sound level of the sound of the handset of telephone set 61. The sound of the handset of telephone set 61 is detected and stored when the handset is ringing in response to a CI call signal.

As described above, according to the present invention, it is possible to provide a normal end sound, an error sound, a registration sound and the like with a small sound level, and to provide a ringing tone for the operator with a large sound level. It is thereby possible to provide a quiet office since the sound level of sounds other than the ringing tone for the operator is small, and to securely perform automatic fax/tel switching. By gradually increasing the ringing tone for the operator, the ringing tone can be heard with a small sound level when the user is present in the vicinity of the facsimile apparatus, and can be heard with a large sound level when the user is present at a place separated from the facsimile apparatus. Since the sound level of the ringing tone for the operator has a value at least equal to a predetermined value even if the sound level of the speaker is very small, the user can always respond to a call for the operator in a fax/tel automatic switching system.

Since only the sound level of the ringing tone for the operator can be set to a large value by setting it independently of the setting of the sound level of other sounds, the operator can hear the ringing tone for the operator even if he is present at a place separated from the apparatus.

By setting the sound level of the ringing tone for the operator to a value equal to the sound level of the handset of the apparatus, the user need not set the sound level of the ringing tone, and an appropriately large sound level can be provided for the sound level of the ringing tone for the operator.

The individual components shown in outline or designated by blocks in the drawings are all well-known in the facsimile apparatus arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus for performing at least image data communication, said apparatus generating a plurality of kinds of audible sounds, including at least a first audible sound indicative of a first operating condition of said apparatus and a second audible sound indicative of a second, different operating condition of said apparatus, said apparatus comprising:

setting means for variably setting a single value in response to a manual instruction by an operator;

first determining means connected to said setting means for determining a first output sound level for the first audible sound in accordance with the single value;

second determining means connected to said setting means for determining a second output sound level, different from the first output sound level, for the second audible sound in accordance with the single value; and output means connected to said first and second determining means for outputting the first audible sound at the first output sound level and the second audible sound at the second output sound level.

2. A communication apparatus according to claim 1, wherein the first output sound level is louder than the second output sound level.

3. A communication apparatus according to claim 1, wherein the first output sound level is always at least as loud as a predetermined sound level regardless of a setting of the single value.

4. A communication apparatus according to claim 1, wherein said first and second determining means are responsive to the single value to determine the first and second output sound levels with a predetermined relationship therebetween.

5. A communication apparatus according to claim 4, wherein the first output sound level is always at least as loud as a predetermined sound level regardless of a setting of the single value.

6. A communication apparatus according to claim 1, wherein the first output sound level varies as a function of the single value, and the second output sound level is a constant.

7. A communication apparatus according to claim 1, wherein the first audible sound is a ringing sound indicative of said apparatus receiving an incoming call.

8. A communication method in a communication apparatus for performing at least image data communication, said method generating a plurality of kinds of audible sounds, including at least a first audible sound indicative of a first operating condition of the apparatus and a second audible sound indicative of a second, different operating condition of the apparatus, said method comprising:

variably setting a single value in response to a manual instruction by an operator;

in accordance with said setting step, determining a first output sound level for the first audible sound in accordance with the single value;

in accordance with said setting step, determining a second output sound level, different from the first output sound level, for the second audible sound in accordance with the single value; and in accordance with said first and second determining steps, outputting the first audible sound at the first output sound level and the second audible sound at the second output sound level.

9. A communication method according to claim 8, wherein the first output sound level is louder than the second output sound level.

10. A communication method according to claim 8, wherein the first output sound level is always at least as loud as a predetermined sound level regardless of a setting of the single value.

11. A communication method according to claim 8, wherein said first and second determining steps are responsive to the single value to determine the first and second output sound levels with a predetermined relationship therebetween.

12. A communication method according to claim 11, wherein the first output sound level is always at least as loud as a predetermined sound level regardless of a setting of the single value.

13. A communication method according to claim 8, wherein the first output sound level varies as a function of the single value, and the second output sound level is a constant.

14. A communication method according to claim 8, wherein the first audible sound is a ringing sound indicative of the apparatus receiving an incoming call.

* * * * *